United States Patent [19]
Hosoya

[11] Patent Number: 5,357,790
[45] Date of Patent: Oct. 25, 1994

[54] MISFIRING DETECTING APPARATUS FOR AN INTERNAL COMBUSTION ENGINE

[75] Inventor: Yasuhiko Hosoya, Himeji, Japan

[73] Assignee: Mitsubishi Denki Kabushiki Kaisha, Tokyo, Japan

[21] Appl. No.: 14,676

[22] Filed: Feb. 8, 1993

Related U.S. Application Data

[62] Division of Ser. No. 841,028, Feb. 25, 1992, abandoned.

[30] Foreign Application Priority Data

Feb. 27, 1991 [JP] Japan .................................. 3-33022
Feb. 28, 1991 [JP] Japan .................................. 3-34378

[51] Int. Cl.⁵ .................... G01M 15/00; F02M 51/00; F02P 5/145
[52] U.S. Cl. .................. 73/117.3; 123/436; 123/492; 364/431.08
[58] Field of Search ............... 73/116, 117.3; 123/436, 123/492; 364/431.08

[56] References Cited

U.S. PATENT DOCUMENTS

| | | | |
|---|---|---|---|
| 4,351,281 | 9/1982 | Geiger et al. | 123/436 |
| 4,428,343 | 1/1984 | Schweikert et al. | 123/492 |
| 4,458,647 | 7/1984 | Krüger | 123/435 |
| 4,492,195 | 1/1985 | Takahashi et al. | 123/339 |
| 4,751,650 | 6/1988 | Wazaki et al. | 364/431.05 |
| 4,873,961 | 10/1989 | Tanaka | 123/492 |
| 4,915,078 | 4/1990 | Sonoda et al. | 123/492 |
| 4,930,479 | 6/1990 | Osawa et al. | 123/436 |
| 5,035,223 | 7/1991 | Watanabe | 123/459 |
| 5,183,021 | 2/1993 | Suga et al. | 123/478 |
| 5,237,504 | 8/1993 | Holmes et al. | 364/431.08 |
| 5,237,862 | 8/1993 | Mangrulkar et al. | 73/116 |
| 5,263,453 | 11/1993 | Wakahara et al. | 73/117.3 |
| 5,309,756 | 5/1994 | Osawa et al. | 73/116 |

FOREIGN PATENT DOCUMENTS

| | | |
|---|---|---|
| 3615547 | 11/1986 | Fed. Rep. of Germany . |
| 3724420 | 2/1989 | Fed. Rep. of Germany . |
| 4009285 | 12/1990 | Fed. Rep. of Germany . |
| 4042093 | 7/1991 | Fed. Rep. of Germany . |

OTHER PUBLICATIONS

European Search Report, Feb. 22, 1993.

Primary Examiner—Thomas P. Noland
Assistant Examiner—George M. Dombroske
Attorney, Agent, or Firm—Sughrue, Mion, Zinn, Macpeak & Seas

[57] ABSTRACT

A misfiring detecting apparatus for an internal combustion engine avoids misidentification of misfiring in the engine in certain operating conditions thereof, thus providing for improved misfiring determination. Angular velocities of a crankshaft of the engine are detected at two crank positions both after top dead center of the engine or respectively before and after thereof. The occurrence of misfiring in the engine is determined on the basis of a deviation between the angular velocities thus detected. Misfiring determination is disabled if the rotational speed of the engine is greater than a predetermined value, or if an engine load is less than a predetermined value, or if the engine is in an engine starting period.

4 Claims, 4 Drawing Sheets

MISFIRING DETECTING APPARATUS FOR AN INTERNAL COMBUSTION ENGINE

This is a divisional of application Ser. No. 07/841,028 filed Feb. 25, 1992 now abandoned.

BACKGROUND OF THE INVENTION

The present invention relates to an apparatus for detecting misfiring in an internal combustion engine, and more particularly to a misfire detecting apparatus for an engine of a motor vehicle.

Misfiring is a phenomenon which occurs in an internal combustion engine when a cylinder of the engine fails to ignite. Misfiring can be due to a number of causes, such as a failure of the ignition system to generate an adequate spark in a cylinder or a failure of a fuel supply system to supply a proper air/fuel mixture to the cylinder. When misfiring is due to a failure of the ignition system, uncombusted fuel is discharged from a misfiring cylinder. The discharge of uncombusted fuel from an engine is of course undesirable because of possible damage to a catalytic converter of the engine and for other reasons. Therefore, it is desirable to be able to detect occurrence of misfiring in an engine and then cut off the supply of fuel to the cylinder in which misfiring has occurred.

Under the circumstances, a typical example of a known misfiring detecting apparatus is shown in FIG. 4. In this Figure, a pulse sensor 1 mounted on an internal combustion engine generates an angular pulse signal containing a series of pulses in synchronism with the rotation of a crankshaft of the engine. A speed sensor 2 receives the angular pulse signal output from the pulse sensor 1, senses angular velocities of the crankshaft at two (i.e., first and second) predetermined angular positions or crank angles thereof before and after top dead center of each cylinder, and generates corresponding speed signals 6, 7. A speed deviation calculator 3 receives the output signals 6, 7 from the speed sensor 2, calculates a deviation between the angular velocities at the first and second crank angles or positions, and generates a corresponding output signal 8 which is input to a misfiring determiner 4. Based on the output signal 8 from the speed deviation calculator 3, the misfiring determiner 4 determines whether the engine is misfiring. That is, the misfiring determiner 4 generates a misfiring signal 9 if the angular velocity deviation obtained by the speed deviation calculator 3 is less than a predetermined value.

In operation of the above-described misfiring detecting apparatus, if misfiring takes place in the engine, the angular velocity deviation obtained by the speed deviation calculator 3 will greatly decrease in comparison with that obtained in the case where normal combustion takes place in the engine. That is, such a great decrease in the angular velocity deviation is detected by the misfiring determiner 4, i.e., by comparing the angular velocity deviation with a predetermined reference value and determining the occurrence of misfiring if the angular velocity deviation is less than the reference value.

Instead of using two angular volocities at the two crank angles before and after top dead center of each cylinder, two angular velocities obtained at two predetermined angular positions or crank angles of the crankshaft both after top dead center of each cylinder may be employed for calculating a deviation therebetween. In this case, too, misfiring determination is performed in the same manner as described above.

With the above-mentioned known misfiring detecting apparatus, however, the angular velocity deviation decreases as the rotational speed of the engine increases or as the engine load decreases. In other words, when the rotational speed of the engine is in a high speed range, or when the engine load is in a low load range, or when the engine is in an engine starting period in which combustion is incomplete or insufficient, the angular velocity deviation calculated by the speed deviation calculator 3 becomes less than the predetermined reference value, so it is mistakenly determined that the engine is misfiring, notwithstanding the fact that normal combustion is taking place in the engine.

SUMMARY OF THE INVENTION

Accordingly, the present invention is aimed at overcoming the above-described problem of the known misfiring detecting apparatus, and has for its object the provision of a novel and improved misfiring detecting apparatus for an internal combustion engine which is able to avoid erroneous misfiring determination in the above-mentioned certain operating conditions of the engine for improved and reliable misfiring detection.

According to one aspect of the invention, there is provided a misfiring detecting apparatus for an internal combustion engine, comprising: means for sensing angular velocities of a crankshaft of the engine at two crank positions before and after top dead center of the engine and for determining the occurrence of misfiring in the engine based on a deviation between the angular velocities thus calculated; means for sensing an operating condition of the engine; and means for disabling a misfiring determination if the engine operating condition as sensed is outside a predetermined engine operating range.

According to another aspect of the invention, there is provided a misfiring detecting apparatus for an internal combustion engine, comprising: means for sensing angular velocities of a crankshaft of the engine at two crank positions after top dead center of the engine and for determining the occurrence of misfiring in the engine based on a deviation between the angular velocities thus calculated; means for sensing an operating condition of the engine; and means for disabling a misfiring determination if the engine operating condition as sensed is outside a predetermined engine operating range.

In a preferred form, the means for sensing an operating condition of the engine comprises a rotational speed sensor for sensing a rotational speed of the engine. The means for disabling a misfiring determination disables a misfiring determination if the rotational speed of the engine is greater than a predetermined value.

In another preferred form, the means for sensing an operating condition of the engine comprises a load sensor for sensing an engine load. The means for disabling a misfiring determination disables a misfiring determination if the engine load as sensed is less than a predetermined value.

In a further preferred form, the means for sensing an operating condition of the engine comprises an engine starting period sensor for sensing a starting period of the engine. The means for disabling a misfiring determination disables a misfiring determination if the engine starting period sensor senses an engine starting period.

The above and other objects, features and advantages of the invention will better be understood by reading the following description of preferred embodiments thereof taken in conjunction with the accompanying drawings.

BRIEF DESCRIPTION OF THE DRAWINGS

In the drawings, the same or corresponding parts are identified by the same symbols.

DESCRIPTION OF THE PREFERRED EMBODIMENTS

Now, the present invention will be described in detail in conjunction with preferred or exemplary embodiments thereof by reference to the drawings.

Figure 1:
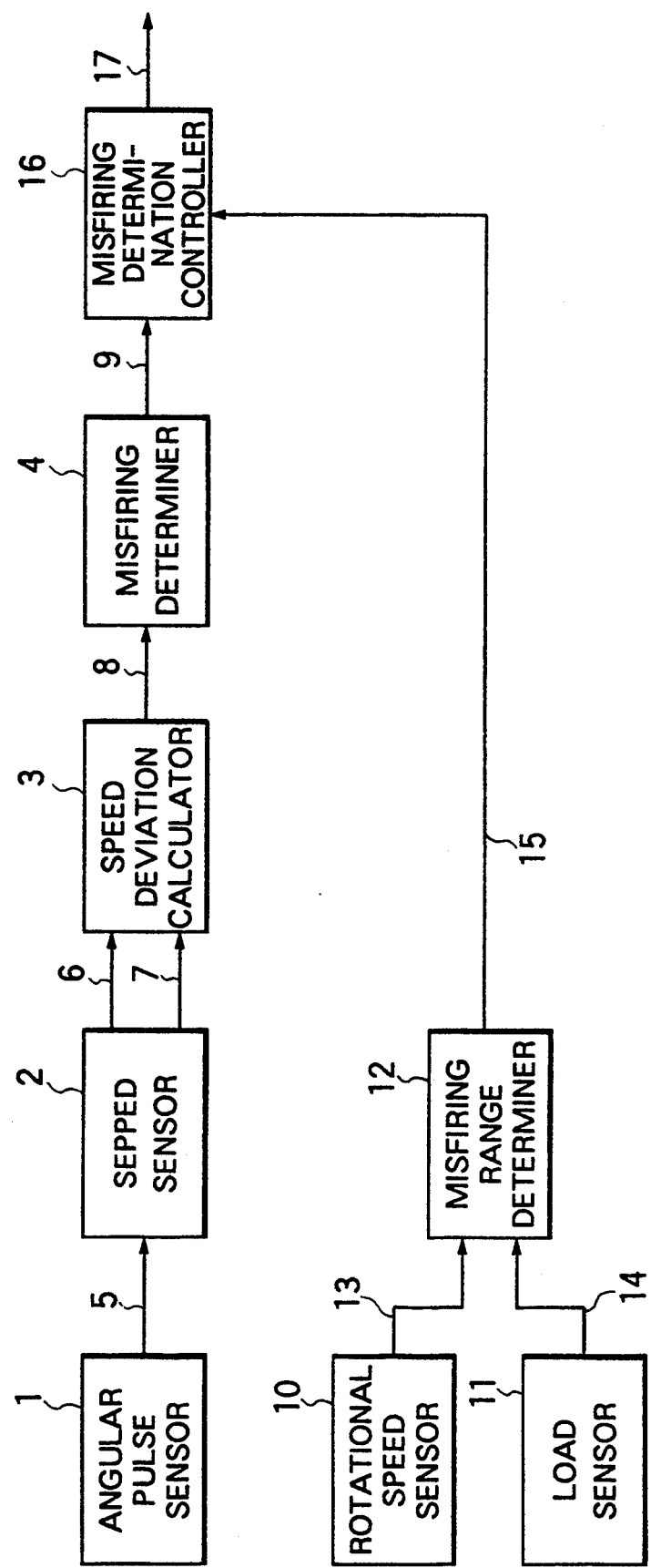
FIG. 1 is a block diagram showing the general arrangement of a misfiring detecting apparatus in accordance with one embodiment of the invention.
Figure 4:
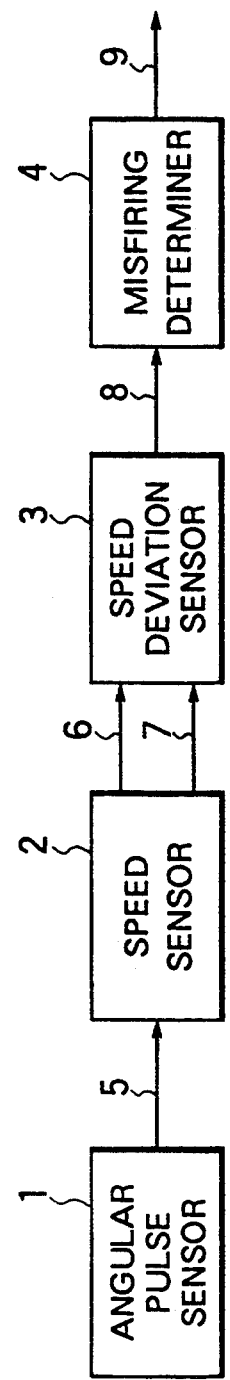
FIG. 4 is a view similar to FIG. 1, but showing the general arrangement of a known misfiring detecting apparatus.

FIG. 1 shows in block form the general arrangement of a misfiring detecting apparatus for an internal combustion engine according to one embodiment of the invention. In this Figure, the apparatus illustrated includes, in addition to elements 1 through 4 which are the same as those employed in the known misfiring detecting apparatus of FIG. 4 previously described, a rotational speed sensor 10 for sensing the rotational speed of a crankshaft of an internal combustion engine and generating a corresponding output signal 13 in the form of a rotational speed signal, a load sensor 11 for sensing an engine load and generating a corresponding output signal 14 in the form of a load signal, a misfiring range determiner 12 connected to receive the output signals 13, 14 from the rotational speed sensor 10 and the load sensor 11 for determining, based on these signals, whether the engine operation is in a particular range of misfiring determination in which misfiring determination is permitted, and generating an output signal 15 in the form of a misfiring detection control or inhibition signal, and a misfiring determination controller 16 connected to receive the output signals 9, 15 from the misfiring determiner 4 and the misfiring range determiner 12 for selectively enabling and disabling the result of the misfiring determination made by the misfiring determiner 4.

The misfiring range determiner 12 is supplied with the output signals 13, 14 from the rotational speed sensor 10 and the load sensor 11 and determines, based on these signals, whether or not the engine operating condition is outside the misfiring determination range. That is, the misfiring range determiner 12 determines that the engine operation is outside the misfiring determination range if the rotational speed signal 13 indicative of the rotational speed of the engine exceeds a predetermined value, or if the engine load signal 14 indicative of the engine load is less than a predetermined value. In this case, the misfiring range determiner 12 generates an output signal 15 in the form of a misfiring detection control or inhibition signal which is input to the misfiring determination controller 16. Upon receipt of the output signal 15 from the misfiring range determiner 12, the controller 16 blocks or inhibits the passage of the misfiring determination signal 9 from the misfiring determiner 4 and generates no output signal. In other words, the controller 16 passes the output signal 9 from the misfiring determiner 4 or generates an output signal 17 in the form of a misfiring detection signal only if the misfiring range determiner 12 generates no output signal.

Figure 2:
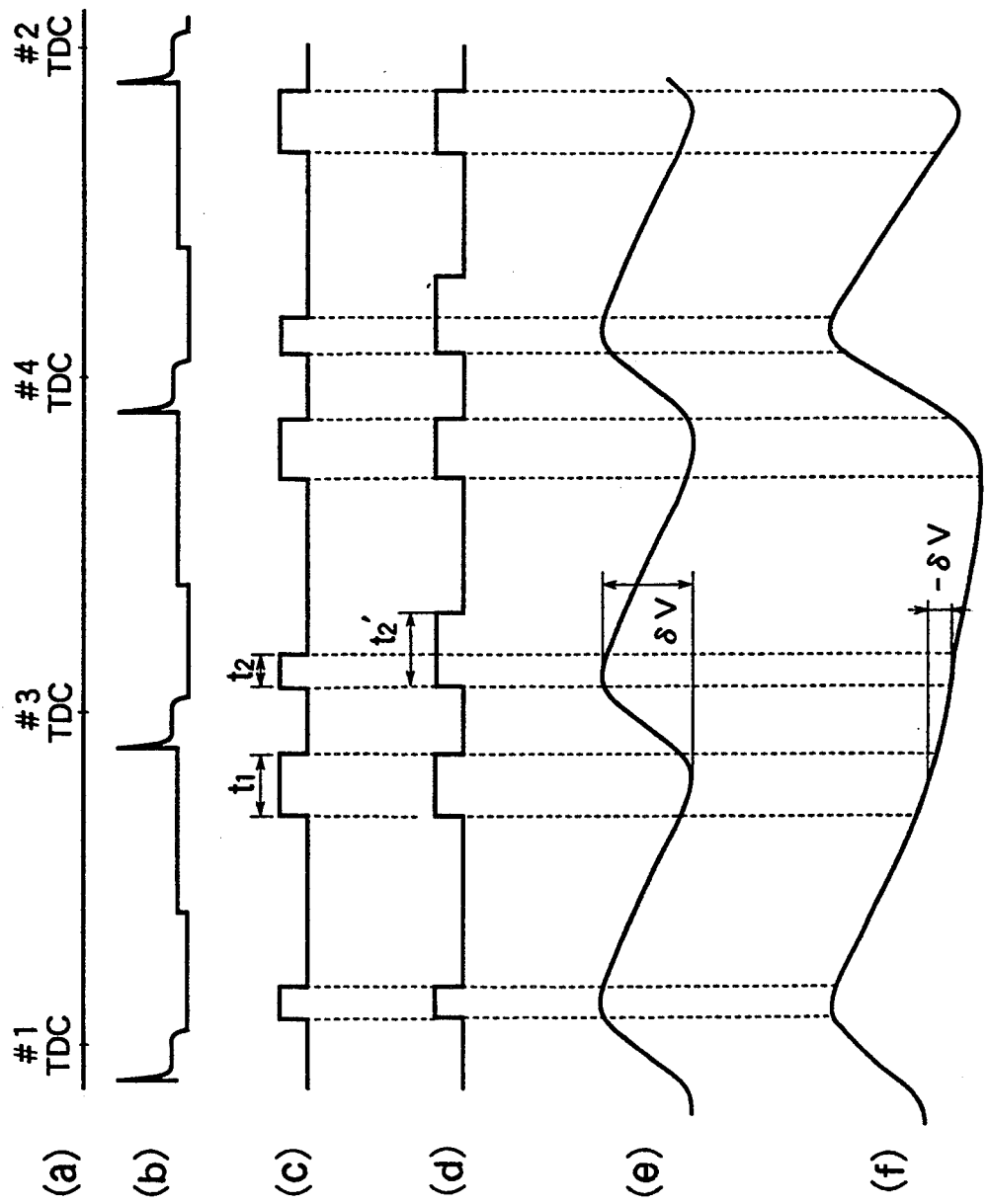
FIG. 2 is a timing chart for explaining the basic operation of the apparatus of FIG. 1.

The operation of the above embodiment will now be described in detail with particular reference to the timing chart of FIG. 2. In FIG. 2, (a) represents crankshaft positions at top dead center for respective cylinders #1 through #4 of the engine (in this case, the engine has four cylinders); (b) represents an ignition signal containing a series of discrete pulses; (c) represents an angular pulse signal 5 which is generated by the angular pulse sensor 1 in the case of normal combustion; (d) represents an angular pulse signal 5 which is generated by the angular pulse sensor 1 in the case of misfiring; (e) represents the angular velocity of the crankshaft which varies over time during normal combustion; and (f) represents the angular velocity of the crankshaft which varies over time in the case of misfiring. Here, it is to be noted that the angular velocity signals shown at (e) and (f) in FIG. 2 are not the signals actually utilized but they are just to assist in explaining a deviation in the angular velocities calculated by the speed deviation calculator 3.

First, the operation of the above-described apparatus in the case of normal combustion will be described. When normal combustion takes place in the engine, the angular pulse sensor 1 generates an angular pulse signal 5 as shown at (c) in FIG. 2. More specifically, it generates an angular pulse $t_1$ having a relatively large pulse width indicative of an angular velocity of the crankshaft at a prescribed first angular position of the crankshaft before top dead center, and another angular pulse $t_2$ having a relatively small pulse width indicative of an angular velocity of the crankshaft at a prescribed second angular position after top dead center. The speed sensor 2 receives the angular pulse signals $t_1$, $t_2$, calculates, based on these signals, angular velocities of the crankshaft at the prescribed crank angles or positions before and after top dead center, and generates a first and a second angular velocity signal 6, 7 representative of the thus calculated angular velocities to the speed deviation calculator 3. Based on these signals 6, 7, the calculator 3 calculates a deviation $\delta V$ between the angular velocities, as depicted at (e) in FIG. 2. The deviation $\delta V$ is then input to the misfiring determiner 4 and compared there with a prescribed reference value. In the case of normal combustion, the deviation $\delta V$ is greater than the reference value, so the misfiring determiner 4 generates no output signal.

On the other hand, in cases where the engine is misfiring, the angular pulse sensor 1 generates an angular pulse signal 5, as shown at (d) in FIG. 2. Specifically, it generates first and second angular pulses $t_1$, $t_2'$ at prescribed crank angles or positions before and after top dead center. In this case, the angular pulse $t_2'$ has a pulse width greater than the angular pulse $t_2$ which is generated during normal combustion. Based on these angular pulse signals $t_1$, $t_2'$, the speed sensor 2 calculates a first and a second angular velocity of the crankshaft at the prescribed crank angles before and after top dead center, and correspondingly outputs a first and a second angular velocity signal 6, 7 to the speed deviation calculator 3 which calculates a deviation $-\delta V$ between the first and second angular velocities, as shown at (f) in FIG. 2. The deviation δV thus obtained is input to the misfiring determiner 4 where it is compared with a predetermined reference value. In this case, the deviation −δV is less than the predetermined reference value, so the misfiring determiner 4 determines the presence of misfiring in the engine and outputs a misfiring determination signal 9 to the misfiring determination controller 16. If the misfiring range determiner 12 generates no output signal, the misfiring determination signal 9 is passed through the misfiring determination controller 16. In other words, the controller 16 generates a misfiring detection signal 17.

With the above-described misfiring detecting apparatus performing the basic operation as referred to above, let us consider the case that as a result of the rotational speed of the engine becoming greater than a predetermined value, the angular velocity deviation δV, which is calculated and output as an output signal 8 by the speed deviation calculator 3, is less than the predetermined value, so that the misfiring determiner 4 erroneously determines the presence of engine misfiring. In this case, the misfiring range determiner 12 makes a comparison between the output signal 13 indicative of the engine rotational speed and the predetermined reference value, determines that the engine operating condition is outside the prescribed misfiring determination range, and generates an output signal 15 in the form of a misfiring detection inhibition signal to the misfiring determination controller 16. As a result, the controller 16 blocks or inhibits the passage of the misfiring determination signal 9 from the misfiring determiner 4 as long as there is a misfiring detection inhibition signal generated by the misfiring range determiner 12, and hence it generates as its output no misfiring detection signal 17. That is, as long as the rotational speed of the engine is greater than the predetermined reference value (i.e., the engine rotational speed is in a high rotational speed range), the determination of misfiring, even if erroneously made by the misfiring determiner 4, is disabled or nullified, thus eliminating inaccurate or faulty misfiring determination at high rotational speeds of the engine.

Next, let us consider the case that the angular velocity deviation given by the speed deviation calculator 3 becomes less than a predetermined reference value as a result of the decreasing engine load, so that the misfiring determiner 4 erroneously determines that the engine is misfiring. In this case, on the basis of a load signal 14 from the load sensor 11, the misfiring range determiner 12 determines that the engine operating condition is outside the misfiring determination range, and generates an output signal 15 in the form of a misfiring detection inhibition signal. Accordingly, as long as a misfiring detection inhibition signal 15 is generated by the misfiring range determiner 12, the misfiring determination controller 16 inhibits the passage of a misfiring determination signal 9 from the misfiring determiner 4 and generates no misfiring detection signal 17. That is, as long as the engine load is less than the predetermined value (i.e., the engine load is in a low load range), the determination of misfiring, if erroneously made, is disabled, thereby avoiding misidentification of engine misfiring under low engine loads.

In summary, according to the above embodiment, in a high rotational speed range or in a low engine load range, erroneous or faulty misfiring detection is positively avoided, thus improving the accuracy in misfiring detection under these engine operating conditions.

Although in the above embodiment, the rotational speed sensor 10 is employed for sensing the rotational speed of the engine, the output signal 5 of the angular pulse sensor 1 can be utilized to provide for the engine rotational speed.

In addition, although in the above description, the misfiring range determiner 12 generates an output signal 15 when the rotational speed of the engine is in a low rotational speed range or when the engine load is in a low load range, it can be modified such that the misfiring range determiner 12 generates an output signal 15 only when both of the above conditions are met.

Figure 3:
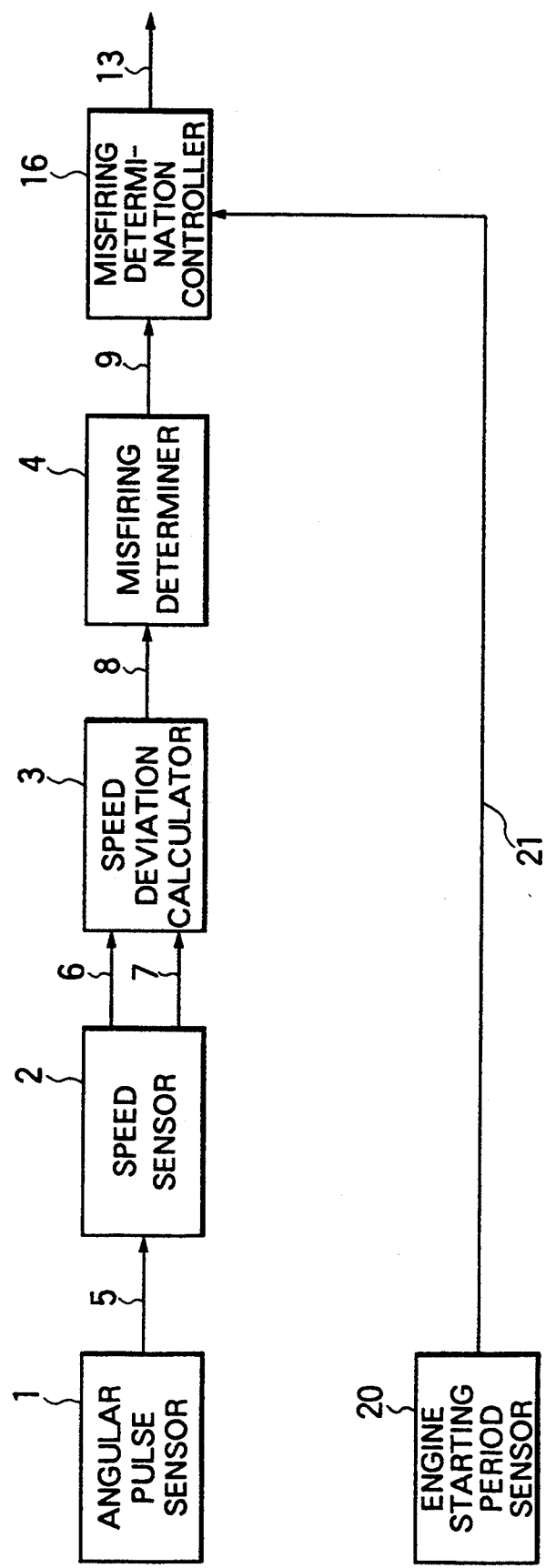
FIG. 3 is a view similar to FIG. 1 but showing a misfiring detecting apparatus in accordance with another embodiment of the invention.

FIG. 3 shows another embodiment of the invention. This embodiment is substantially similar in construction and operation to the previous embodiment of FIG. 1 except that the rotational speed sensor 10, the load sensor 11 and the misfiring range determiner 12 of FIG. 1 is replaced by an engine starting period sensor 20. The engine starting period sensor 20 senses a starting period of an engine in which combustion is not complete and stable, and it generates a corresponding output signal in the form of an engine starting period signal 21 to a misfiring determination controller 16. To this end, the engine starting period sensor 20 comprises a starter motor wherein a voltage supplied to the starter motor for starting the engine is applied as an engine starting signal to the misfiring determination controller 16. Upon receipt of the output signal 21 from the engine starting period sensor 20 (i.e., when the voltage applied to the controller 16 is higher than a prescribed reference voltage), the controller 16 inhibits the passage of a misfiring determination signal 9 output from the misfiring determiner 4 whereas it allows the passage of the misfiring determination signal 9 in the absence of the output signal form the engine starting period sensor 20. Thus, the misfiring determination controller 16 inhibits misfiring determination as long as the engine starting period signal 21 is present, thus avoiding erroneous misfiring determination during engine starting periods.

What is claimed is:

1. A misfiring detecting apparatus for an internal combustion engine, comprising:
means for sensing and calculating angular velocities of a crankshaft of the engine at a crank position before and after top dead center of the engine;
misfiring determination means for determining the occurrence of misfiring in the engine based on a deviation between the angular velocities thus calculated;
means for sensing an operating condition of the engine and outputting a signal corresponding thereto; and
means, responsive to said signal, for disabling said misfiring determination means if said signal is outside of a predetermined engine operating range, wherein said means for sensing an operating condition of the engine comprises a load sensor for sensing an engine load, and said means for disabling said misfiring determination means being disabled if the sensed engine load is less than a predetermined value.

2. A misfiring detecting apparatus for an internal combustion engine according to claim 1, wherein said means for sensing an operating condition of the engine further comprises an engine starting period sensor for sensing a starting period of the engine, and said means for disabling said misfiring determination means being disabled if said engine starting period sensor senses a starting period of the engine.

3. A misfiring detecting apparatus for an internal combustion engine, comprising:

means for sensing and calculating angular velocities of a crankshaft of the engine at two crank positions after top dead center of the engine;

misfiring determination means for determining the occurrence of misfiring in the engine based on a deviation between the angular velocities thus calculated;

means for sensing an operating condition of the engine and for outputting a signal corresponding thereto; and means, responsive to said signal, for disabling said misfiring determination means, if said signal is outside of a predetermined engine operating range, wherein said means for sensing an operating condition of the engine comprises a load sensor for sensing an engine load, and said means for disabling said misfiring determination means being disabled if the sensed engine load as sensed is less than a predetermined value.

4. A misfiring detecting apparatus for an internal combustion engine according to claim 3, wherein said means for sensing an operating condition of the engine further comprises an engine starting period sensor for sensing a starting period of the engine, and said means for disabling said misfiring determination means being disabled if said engine starting period sensor senses a starting period of the engine.

* * * * *